No. 734,913. PATENTED JULY 28, 1903.
A. H. MARKS.
PNEUMATIC TIRE.
APPLICATION FILED SEPT. 9, 1902.
NO MODEL.

Witnesses.
E. B. Gilchrist
N. L. Brennan

Inventor.
Arthur H. Marks,
By his Attorneys,
Thurston & Bates.

No. 734,913. Patented July 28, 1903.

UNITED STATES PATENT OFFICE.

ARTHUR H. MARKS, OF AKRON, OHIO, ASSIGNOR TO THE DIAMOND RUBBER COMPANY, OF AKRON, OHIO, A CORPORATION OF OHIO.

PNEUMATIC TIRE.

SPECIFICATION forming part of Letters Patent No. 734,913, dated July 28, 1903.

Application filed September 9, 1902. Serial No. 122,699. (No model.)

*To all whom it may concern:*

Be it known that I, ARTHUR H. MARKS, a citizen of the United States, residing at Akron, in the county of Summit and State of Ohio, have invented a certain new and useful Improvement in Pneumatic Tires, (Case B,) of which the following is a full, clear, and exact description, reference being had to the accompanying drawings.

The object of this invention is to provide in very simple and efficient form a pneumatic tire having an outer sheath securely held to the rim whether the tire be inflated or not, but capable of ready removability when desired. In automobile use especially it is extremely desirable not to rely on the inflation of the tire to hold it in place, for in that case a puncture when the machine is running rapidly is very liable to cause an accident by reason of the tire leaving the rim. In my invention, as stated, the tire is securely held to the rim whether inflated or not; and the invention consists of the means employed to this end, which also allow the tire-sheath to be readily removable and protect its edges when in place. This is hereinafter described, and fully set out in the claims.

Figure 1:
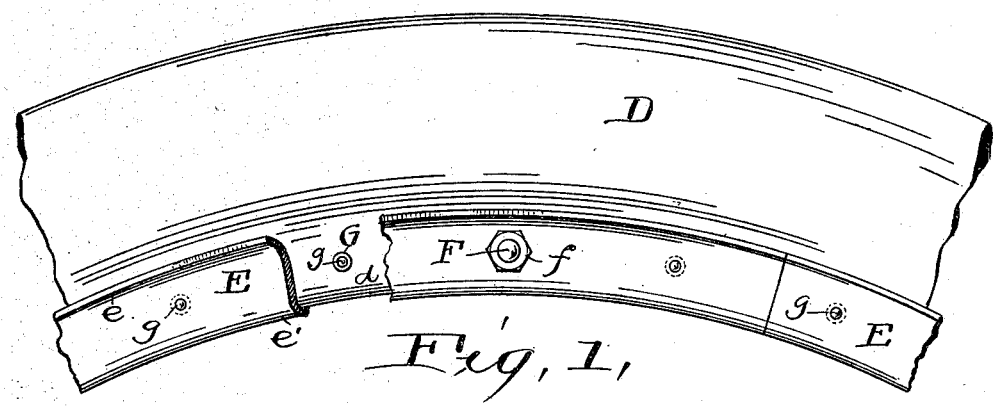
Figure 2:
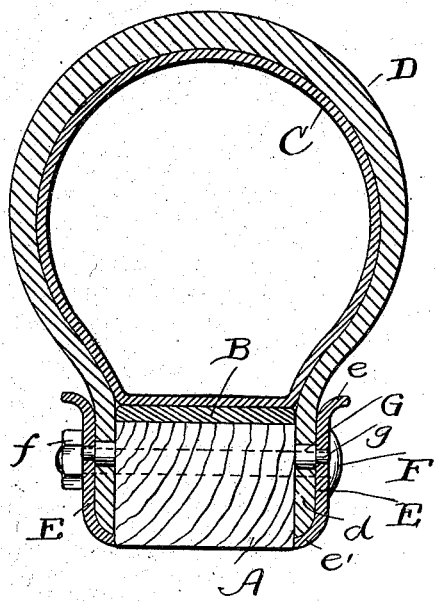
Figure 3:
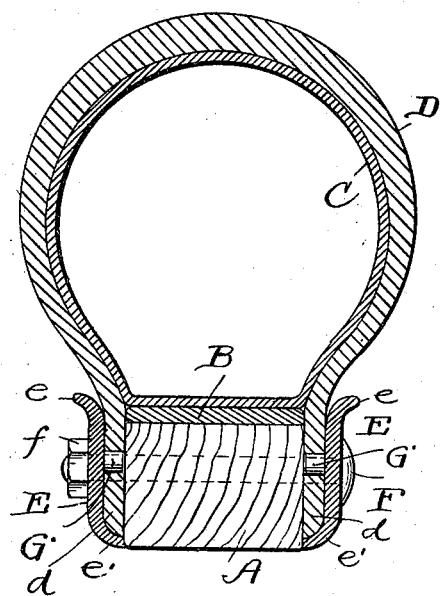

The drawings clearly illustrate my invention, Figure 1 being a side elevation of a portion of my tire in place on the wheel-rim. Fig. 2 is a transverse section of the same, and Fig. 3 is a section of a modified construction.

Referring to the parts by letters, A represents a wooden rim surrounded by a metal band B, these parts being of usual form.

C is an inner pneumatic tube, and around this is the outer sheath D. This sheath extends inward, as at $d$, on opposite sides of the rim A. Side plates E are placed outside of the portion $d$ of the sheath and are held thereto by bolts F, passing through the side plates, sheath, and rim and taking on their ends nuts $f$.

The sheath and the side plates E are locked together in operation by pins carried by one of these members taking into the other. In the form shown in Figs. 1 and 2 these pins G are embedded in the flat portions $d$ of the sheath, and they have smaller extensions $g$, taking into holes in the side plates E. In the form shown in Fig. 3 the pins G' are rigid with the side plates, projecting into openings therefor in the sheath. In either event the sheathing is securely interlocked with the side plates, and the side plates being held at the rim by bolts securely hold the tire in place whether inflated or not. The sheath may be very easily removed for repair. For this reason I prefer to make the side plates E in section, so that in case of a puncture it may only be necessary to remove a portion of one side.

The side plates E are curved away from the sheath at their outer edges, as at $e$, to prevent cutting the sheath when pressure is upon the tire, while at their inner edges these plates curve inward, as at $e'$, beneath the sheath, abutting the rim at this point. This latter inward curve not only gives a very neat appearance to the tire, but it protects the inner edge of the sheath.

I claim—

1. In a detachable pneumatic tire, the combination of a rim, an inner tube surrounding the same, a sheath outside of the inner tube extending onto opposite sides of the rim, plates removably carried on opposite sides of the rim, bolts extending through said rim for holding said plates in place, and short pins for locking the sheath to the plates, said pins being carried by one of such members at points opposite the sides of the rim, substantially as described.

2. In a detachable pneumatic tire, the combination of a rim, an inner tube surrounding the same, a sheath outside of the inner tube and extending onto opposite sides of the rim, pins carried by said sheath having reduced outer extensions, and removable side plates having openings into which said extensions take, and means for holding said side plates in place, substantially as described.

3. In a detachable pneumatic tire, the combination of a rim, an inner tube surrounding the same, a sheath outside of the inner tube and extending onto opposite sides of the rim, outwardly-extending short pins carried by said sheath at points opposite the sides of the rim, removable side plates having openings into which said pins take, and bolts passing through the rim for holding said side plates in place, substantially as described.

In testimony whereof I hereunto affix my signature in the presence of two witnesses.

ARTHUR H. MARKS.

Witnesses:
D. GALEHOUSE,
O. S. HART.